United States Patent [19]
Lee et al.

[11] Patent Number: 5,453,222
[45] Date of Patent: Sep. 26, 1995

[54] CONTACT TRAY APPARATUS AND METHOD

[75] Inventors: Adam T. Lee, Richardson; Michael J. Binkley, De Soto; Kuang Wu, Plano; Larry Burton, De Soto, all of Tex.

[73] Assignee: Glitsch, Inc., Dallas, Tex.

[21] Appl. No.: 306,672

[22] Filed: Sep. 15, 1994

[51] Int. Cl.$^6$ .................................................. B01F 3/04
[52] U.S. Cl. .................................. 261/114.1; 261/114.4
[58] Field of Search ............................ 261/114.1, 114.4

[56] References Cited

U.S. PATENT DOCUMENTS

| | | | |
|---|---|---|---|
| 3,410,540 | 11/1968 | Bruckert | 261/113 |
| 3,959,419 | 5/1976 | Kitterman | 261/98 |
| 4,499,035 | 2/1985 | Kirkpatrick et al. | 261/114.3 |
| 4,504,426 | 3/1985 | Chuang et al. | 261/114.1 |
| 4,543,219 | 9/1985 | Yamato et al. | 261/109 |
| 4,597,916 | 7/1986 | Chen | 261/94 |
| 4,603,022 | 7/1986 | Yoneda et al. | 261/114.1 |
| 4,604,247 | 8/1986 | Chen et al. | 261/94 |
| 5,120,474 | 6/1992 | Binkley et al. | 261/114.4 |
| 5,277,848 | 1/1994 | Binkley et al. | 261/114.1 |
| 5,389,343 | 2/1995 | Gentry | 261/114.1 |

FOREIGN PATENT DOCUMENTS

| | | | |
|---|---|---|---|
| 1091533 | 10/1960 | Germany | 261/114.1 |

*Primary Examiner*—Tim R. Miles
*Attorney, Agent, or Firm*—Jenkens & Gilchrist

[57] ABSTRACT

A downcomer tray assembly for vapor liquid contact towers. The downcomer is formed with generally semi-conical walls forming a vapor tunnel relative to the discharge region therebeneath. The discharge region is also constructed with a trough and a plurality of venting chambers upstanding therefrom for improving mass transfer efficiency. The venting chambers reduce fluid pressure to vent excess vapor from the underlying tray. The vented vapor is selectively directed into the liquid discharged from the downcomer and allowed to pass through the vapor tunnel. In this manner both entrained liquid and entrained gas can be effectively released to facilitate a stabilized vapor-liquid flow configuration.

40 Claims, 3 Drawing Sheets

CONTACT TRAY APPARATUS AND METHOD

BACKGROUND OF THE INVENTION

1. Field of the Invention

The present invention pertains to gas-liquid contacting trays and, more particularly, to an improved downcomer-tray assembly incorporating an active inlet area beneath the downcomer for venting excess vapor pressure from the underlying tray.

2. History of the Prior Art

Distillation columns are utilized to separate selected components from a multicomponent stream. Generally, such gas-liquid contact columns utilize either trays, packing or combinations of each. In recent years the trend has been to replace the so-called "bubble caps" by sieve and valve trays in most tray column designs. Additionally, random (dumped) or structured packings have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays generally come in one of two configurations: cross-flow and counter flow. The trays generally consist of a solid tray or deck having a plurality of apertures and are installed on support rings within the tower. In cross-flow trays, vapor ascends through the apertures and contacts the liquid moving across the tray; through the "active" area thereof. In the active area, liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. The location of the downcomers determine the flow pattern of the liquid. If there are two Inlet Downcomers and the liquid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) liquid rate increases. It is the active area of the tray, however, which is of critical concern.

Not all areas of a tray are active for vapor-liquid contact. For example, the area under the Inlet Downcomer is generally a solid region. To attempt to gain more area of the tray for vapor/liquid contact, downcomers are often sloped. The maximum vapor/liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray.

A variation for increasing the Bubbling Area and hence vapor/liquid handling capacity is a Multiple Downcomer (MD) tray. There are usually many box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of the tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface. The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The concentration-difference between the vapor and the liquid can be effected in many ways; some reducing efficiency. For example, as operating pressure increases, descending liquid begins to absorb vapor as it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released otherwise the downcomer can not accommodate the liquid/vapor mixture and will flood thus preventing successful tower operation.

For conventional trays as shown below, the released vapor must oppose the descending frothy vapor/liquid mixture flowing over the weir into the downcomer. In many cases, such opposition leads to poor tower operation and premature flooding.

Another serious problem which manifests itself in such operational applications is entrainment of liquid droplets in the ascending vapor. This phenomenon, which is virtually the opposite of the above vapor entrainment, can prevent effective vapor liquid contact. Liquid entrainment is, in one sense, a dynamic flow condition. High velocity vapor flow can suspend descending liquid droplets and prevent their effective passage through the underlying froth mixture zone. It is particularly difficult to prevent this problem when the tower applications require high volume vapor flow in a direction virtually opposite to that of high volume, descending liquid flow.

The technology of gas-liquid contact addresses many performance issues. Examples are seen in several prior art patents, which include U.S. Pat. Nos. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A crossflow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings mounted to the top of the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure loss are set forth. Such references are useful in illustrating the need for high efficiency vapor liquid contact in tray process towers. U.S. Pat. No. 4,504,426 issued to Carl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat. No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray.

Yet a further reference addressing downcomer tray assemblies and methods of mixing vapor with liquid from a discharge area of a downcomer is set forth and shown in U.S. Pat. No. 4,956,127 (the '127 Patent) assigned to the assignee of the present invention. In the '127 Patent, a raised active inlet area as set forth and shown, which inlet area is provided for the venting of vapor from the tray therebeneath. The raised inlet area reduces fluid pressure of the vapor to facilitate the flow of ascending vapor therethrough. A series of louvers disposed on the raised active inlet area selectively directs the upward flow of vapor into the liquid region below the downcomer to generate more efficient vapor liquid contact and reduced back mixing across the tray. The discharge of liquid from the downcomer onto the raised active inlet area, though effective, has been shown to result in weeping as the discharged liquid from the downcomer passes through the apertures of the active inlet area. Additionally, the liquid splashing outwardly from the downcomer increases the frothiness thereof and causes liquid drops to be more easily suspended. It would therefore be an advantage to provide preferential vapor flow through a raised active inlet area disposed beneath the downcomer with means for dampening the splashing of liquid passing from the downcomer. Such an improved vapor passage means would, by necessity, require that the apertures facilitating the upward passage of vapor not readily permit the ingress of descending liquid from the downcomer to pass therethrough.

It likewise would be an advantage to provide a method of and apparatus for enhanced downcomer-tray vapor flow manifesting increased efficiency in the venting of entrained vapor, controlled vapor flow beneath the discharge area of a downcomer and directionalized vapor flow across the tray to facilitate the release of entrained liquid. Such a downcomer-tray assembly is provided by the present invention wherein a depressed, or troughed inlet area having venting chambers upstanding therein is secured beneath a generally semi-conical downcomer the outside of which further functions as a vapor tunnel. The troughed region and venting chambers are disposed beneath the vapor tunnel downcomer for providing direct vapor injection from the underlying tray region into the liquid flow which is effective in achieving greater vapor-liquid handling capacity. Likewise, the momentum of the falling liquid which can cause weeping through the active area below is substantially dampened by the liquid in the trough and the effective vapor flow discharge through the upstanding venting chambers formed therein.

SUMMARY OF THE INVENTION

The present invention pertains to enhanced downcomer-tray vapor flow for a process column. More particularly, one aspect of the invention includes an improved downcomer-tray assembly for a process column of the type wherein liquid flows downwardly through a first downcomer onto a first tray and across the active area thereof. Across this active area vapor flows upwardly for interaction and mass transfer with the liquid. The liquid then passes from the tray through a second downcomer. The improvement of the present invention comprises an inlet area disposed beneath the discharge area of the first downcomer with a plurality of vapor venting chambers upstanding thereon and a generally semi-conical downcomer, the outside of which further functions as a vapor tunnel for vapor venting through the venting chambers. This configuration establishes vented, directionalized vapor flow beneath and against the outside wall of the downcomer for injecting vapor into the region beneath the downcomer and above the active tray area adjacent thereto. The inlet area may also be formed as a trough whose bottom is below the tray area. Preferentially vented vapor from the tray below can aerate descending liquid from the downcomer while being effectively channeled into its most productive flow pattern. The problem of vapor choking is also less of a concern with such a configuration.

In another aspect, the invention includes the improved downcomer-tray assembly described above wherein the generally semi-conical downcomer is constructed with a plurality of planar body sections forming the vapor tunnel. In one embodiment, the downcomer is constructed of planar body portions angulated toward the troughed inlet region for establishing a vapor tunnel outwardly thereof. The discharge region of the downcomer may comprise a plurality of apertures formed in an arcuate pattern across the lower region of the downcomer and disposed above the inlet area in generally parallel spaced relationship thereto.

In a further aspect, the invention includes an improved method of mixing vapor with liquid discharged from a downcomer of a process column onto an underlying tray with the column having a plurality of trays and downcomers spaced vertically one from the other and maintaining liquid-vapor flow stability therein. The improvement comprises forming the tray with a troughed inlet area having vapor venting chambers therein disposed beneath the discharge area of the downcomer and venting vapor through the inlet area from the downcomer and tray region thereunder. The vented vapor is vectored into engagement with the discharged liquid and outwardly from the inlet area through a vapor tunnel formed by the outside walls of the downcomer.

In yet another aspect of the invention, the above described troughed inlet panel comprises a plurality of raised venting chambers disposed beneath a plurality of downcomer discharge orifices which are spaced one from the other. The venting chambers are vertically aligned beneath the spaces between the discharge orifices so that liquid discharge therefrom lands primarily into the trough region between the chambers. Since the trough region is filled with liquid during operation, the falling force of the discharged liquid is dampened.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
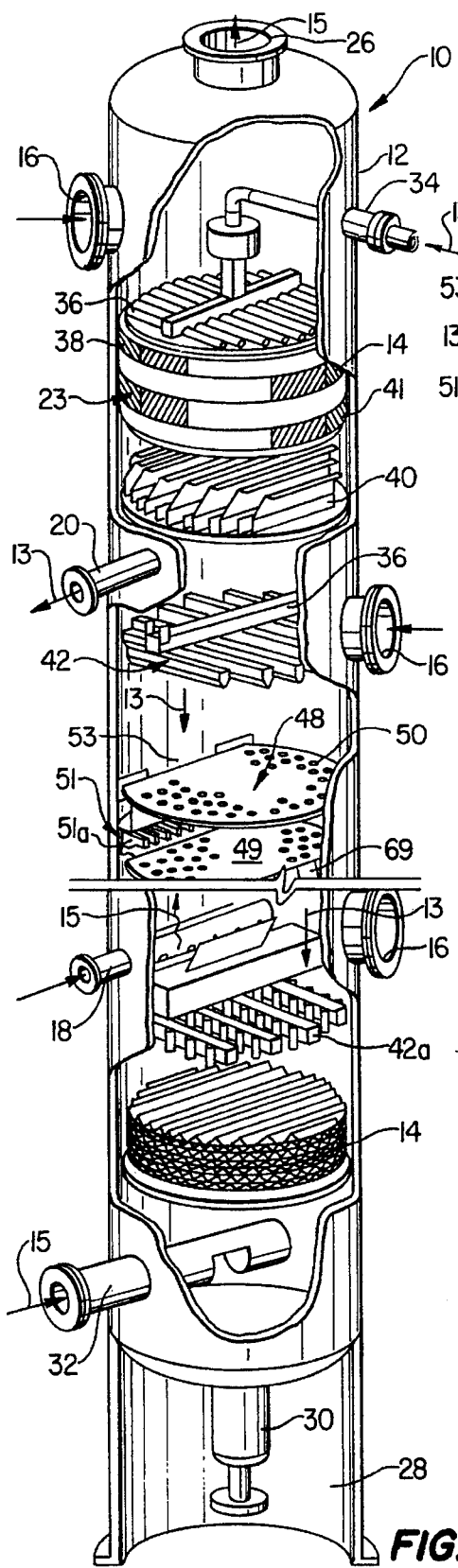
FIG. 1 is a perspective view of a packed column with various sections cut away for illustrating a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing A liquid distributor 42, adapted for redistributing liquid 13, is likewise disposed there-beneath. A second type of distributor 42a is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Such trays comprise plates which are perforated or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change. But such is not the case herein.

In the present embodiment, cross-flow trays 48 and 49 and downcomers 53 and 69 are illustrated. Tray 48 incorporates a MINI VALVE surface 50, for which the term "MINI VALVE" and the type of surface will be discussed below. Tray 49 includes the MINI VALVE surface and a trough section 51 beneath downcomer 53, which in accordance with the present invention includes a plurality of vapor venting chambers 51a formed thereacross. The downcomer 53 is also formed with a generally semi-conical wall, as will be described below. The venting chambers 51a in the trough section 51 are raised sections of the tray itself which have apertures formed therein in a select array as will be described below. The size, spacing and number of chambers 51a are the result of a myriad of critical design considerations including liquid/vapor ratios, liquid cooling, liquid flow/backmixing, foaming (froth) height, froth uniformity, the presence of solids or slurries therein and the requisite need to vent excess pressure in the underlying tray. Corrosion is likewise a consideration of the various elements in the packed towers and the selection of the material, design, and the fabrication of the tower internal is, in many instances, the result of such considerations. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
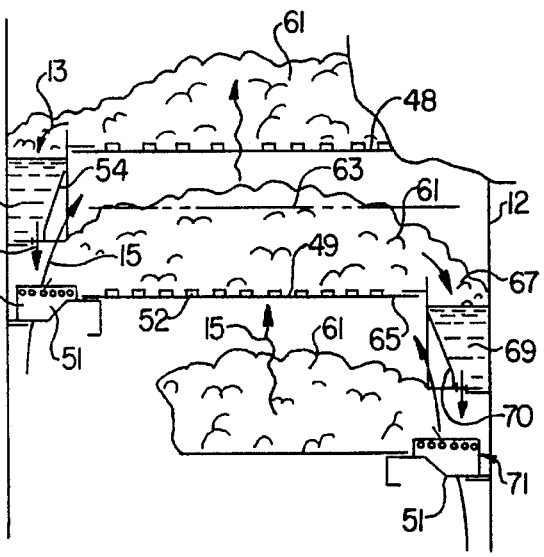
FIG. 2 is a diagrammatic, side-elevational, cross-sectional view of the improved downcomer-tray assembly of the present invention secured within a process tower and illustrating the flow of liquid and vapor thereacross.

Referring now to FIG. 2, there is shown a side-elevational, cross-sectional, diagrammatic view of several aspects of the present invention. Trays 48 and 49 are planar panels that are perforated and installed with the MINI VALVES described below. Other tray surfaces may, of course, be used. Liquid 13 travels down a chordal downcomer 53 comprising generally semi-conical section 54, from tray 48 disposed thereabove. The outside wall of the generally semi-conical section 54 of the downcomer provides a tunnel for vapor flow from the chambers 51a, which tunnel affords a horizontal flow vector to the vapor vented through venting chambers 51a. The liquid 13 engages the vented vapor 15 discharged from the chambers 51a of trough section 51 beneath the downcomer 53. Entrained gas escaping from the lower downcomer below the venting region is able to ascend directly into and through the chambers 51a. Without the venting chambers 51a, in this particular embodiment, there would be no preferential vapor flow of the gas escaping from the downcomer and all vapor would then tend to rise through the conventional active region 52. This engagement controls the direction of vented vapor and liquid flow across the central active region 52 of tray 49; the taper of the generally semi-conical section 54 imparting a horizontal flow characteristic to the vapor. The chambers 51a permit any excess vapor pressure to be vented through the trough section 51 and into a flow configuration which facilitates proper tower operation rather than creating more problems. For example, as described below, the vapor tunnel of section 54 prevents choking, promotes vapor liquid interaction and entrained liquid is induced to drop out due to the flow configuration. The remaining ascending vapor 15 passing through the plurality of holes of said active region 52 may rise vertically to create a froth 61. The froth or "foam" is a region of aeration in which the phase of the liquid 13 is continuous.

When the froth 61 does not exist or becomes discontinuous, an inversion to a gas-continuous regime can result in a "spray" of gas upwardly therethrough. With the vapor-liquid tunnel and downcomer-tray assembly of the present invention, the likelihood of this gas continuous regime is greatly reduced.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into generally semi-conical region 70 where the liquid accumulates and disperses upon the venting chambers 51a of trough section 71 therebeneath. Trough section 71 is shown herein in a diagrammatic fashion for purposes of illustration only. The area of holes and perforations for a single crossflow plate establishes the active length of the plate and the zone in which the froth 61 is established. It should be noted that the present invention would also be applicable to multiple downcomer configurations, wherein downcomers and troughed section 51 and 71 may be positioned in intermediate areas of the trays. By increasing the total active area by active venting chambers 51a greater capacity and efficiency are achieved.

Figure 3A:
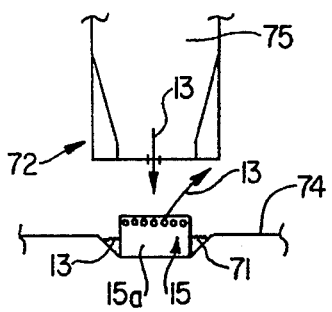
FIGS. 3A and 3B are a diagrammatic, side elevational, cross-sectional views of alternative embodiments of the downcomer-tray assembly of FIG. 2.
Figure 3B:
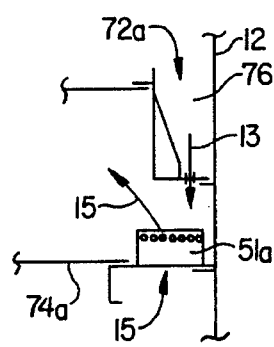

Referring now to FIGS. 3A and 3B, there are shown diagrammatic, side elevational cross-sectional views of alternative embodiments of the downcomer tray assembly of FIG. 2. A portion of an intermediate downcomer tray assembly 72 is herein shown in FIG. 3A schematically adjacent a variation of a chordal downcomer tray assembly 72a in FIG. 3B. In FIG. 3A intermediate downcomer 75 is disposed above tray 74 of a process column 12. Chordal downcomer 76 is disposed above a tray 74a in FIG. 3B. It may be seen that in FIGS. 3A and 3B, two different styles of assemblies of venting chamber 51a are shown. Beneath intermediate downcomer 75, for example, a trough 71 is formed in an intermediate portion of tray 74 with venting chamber 51a upstanding therefrom. Trough 71 is shown formed in tray 74 in this position for purposes of illustration only. In FIG. 3B, for purposes of illustration, the venting chamber 51a disposed beneath side wall downcomer 76 is not formed with a trough therearound. This assembly is an alternative embodiment of the venting chamber 51a wherein the trough design is not utilized. The flow of vapor 15 upwardly through the venting chamber 51a is, of course, affected as arrows 15 illustrate. With the trough 71, (FIG. 3A) liquid 13 is permitted to accumulate therein to thereby impart dampening of the liquid 13 discharged from the intermediate downcomer 75. Liquid 13 discharged from side wall downcomer 76 (FIG. 3B) would simply engage the generally flat tray section 74a disposed thereunder or the top of the venting chamber 51a. It may thus be seen that the present invention may accommodate both single pass and multi-pass trays.

Figure 4:
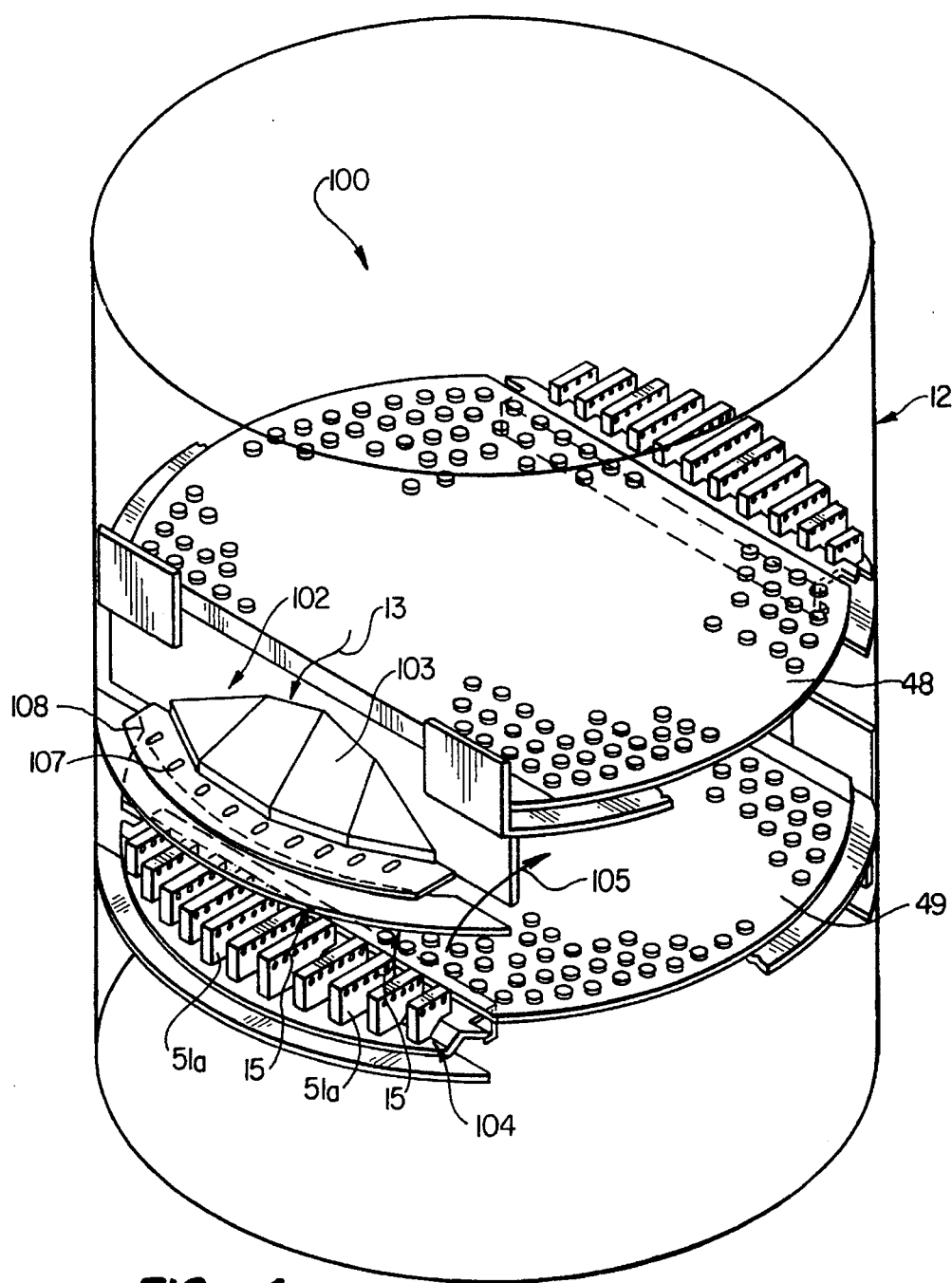
FIG. 4 is a perspective view of the downcomer-tray assembly of the present invention, with portions thereof cut away for purposes of clarity.

Referring now to FIG. 4, there is shown an enlarged, fragmentary perspective view of a downcomer-tray assembly 100 constructed in accordance with the principles of the present invention. The trays 48 and 49 as shown herein are constructed for placement in the tower 12 whereby a feeding downcomer 102 having generally semi-conical walls 103, can be disposed over troughed inlet region 104 for providing liquid 13 from tray 48 to tray 49. Liquid 13 spills down into downcomer 102 and out discharge apertures 107 of discharge plate 108. The apertures 107 are aligned between vapor venting chambers 51a wherein the liquid 13 is discharged into the liquid 13 standing in the inlet region 104. The liquid 13 then flows across tray 49. The troughed panel 104 is constructed with the venting chambers 51*a* referenced above which vent vapor 15 upwardly into the vapor tunnel 103*a* (shown in FIG. 6) formed by the walls 103 facing the tray 49. The vapor vented from the underlying tray through the venting chambers 51*a*, flows away from the trough panel 104 through the vapor tunnel 103*a* for interaction with the liquid 13. In this manner, distinct advantages may be recognized. Vented vapor 15 will be carried away by the vapor tunnel 103*a*. The horizontal vapor flow aspect represented by arrows 105 will facilitate the dropping out of liquid droplets entrained in the vapor flow. Such entrainment is common in towers with ascending vapor flow, but can be exacerbated with a raised active inlet panel.

Figure 5:
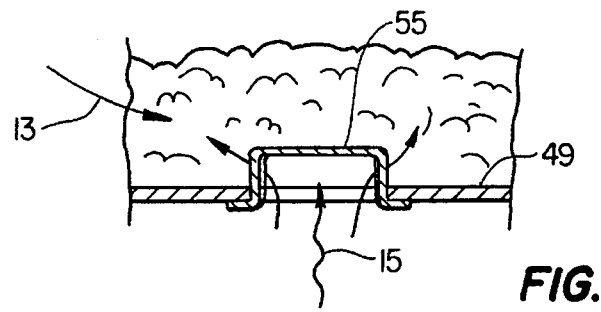
FIG. 5 is an enlarged, side elevational, cross sectional view of a representative active tray area taken along lines 5—5 of FIG. 4.

Referring now to FIG. 5, an enlarged cross section of the tray assembly 49 is diagrammatically shown. In this embodiment, a MINI VALVE type tray is constructed with valves 55 of the floating variety across the surface thereof. MINI VALVE is a federally registered trademark of the assignee of the present invention (U.S. Trademark Registration No. 1,777,008) and the valves 55 thereof are deployed across the central active area of tray 49 in this particular embodiment. U.S. Pat. No. 5,120,474 illustrates in more detail the MINI VALVE structure. Gas 15 is shown rising through valve 55 to engage liquid 13 flowing orthogonal thereto from the downcomer 102 of FIG. 4. The result is a turbulent pattern of gas and liquid engagement effecting efficient mass transfer. Likewise, froth height is maximized, entrainment is minimized and low pressure drop results in reduced downcomer backup. The directionalized flow from the venting chambers 51*a* of troughed panel 104 provides an enhancement in tray efficiency, with minimum height. It should also be noted that any style of valves or apertures could be incorporated into the active area of tray 49. Although MINI VALVES are shown, bubble cap trays, other slotted openings, perforations, valves (both fixed and moveable) could be used with the present invention.

Figure 6:
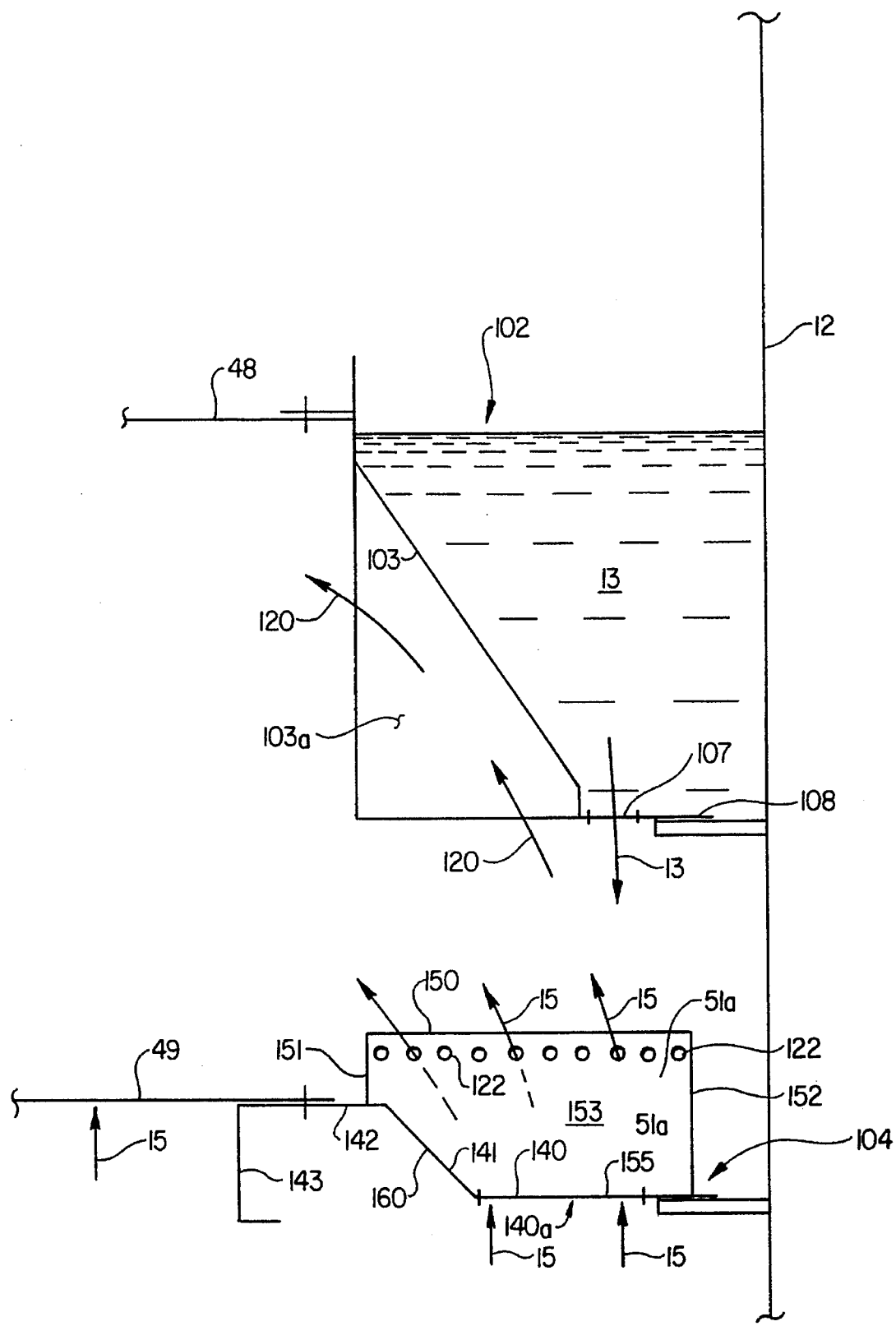
FIG. 6 is an enlarged, side elevational, fragmentary view of the downcomer-tray area of FIG. 4 and diagrammatical representation of the vapor venting chambers and vapor tunnel of the present invention.

Referring now to FIG. 6, there is shown an enlarged, side elevational cross sectional view of the downcomer 102 and troughed panel 104 of FIG. 4. The downcomer 102 is seen to incorporate the generally semi-conical walls 103 which may be used to increase vapor flow efficiency as discussed above. The walls 103 are preferably formed from flat plates welded together in the configuration shown herein. The slots 107 are formed in the lower discharge plate 108 thereof for discharging liquid 13 to the area of trough 104 directly between vapor venting chambers 51*a* and into engagement with ascending vapor 15. The downcomer discharge area is narrower than the upper region of the downcomer to thereby establish a dynamic liquid seal therein. Liquid 13 is then discharged downwardly while vapor ascends upwardly. Arrows 120 illustrate the flow of vapor 15 through the vapor tunnel 103*a*. The vapor 15 is discharged from the venting chambers 51*a* through apertures 122 formed therein. Although only a single row of apertures 122 is shown on each side of each chamber 51*a*, a variety of hole patterns could be used. The size and shape of each chamber 51*a* may also vary.

Referring still to FIG. 6, the present invention comprises an improved downcomer tray assembly for a gas liquid contact tower of the type having a downcomer disposed above a tray inlet area adjacent a tray active area adapted for the flow of liquid thereover. The improvement comprises the downcomer 102 having a generally semi-conical walls 103 that are preferably formed by flat plates welded together as shown herein. The downcomer 102 terminates in an elongated, arcuate plate 108 having a plurality of apertures 107 facilitating the discharge of liquid therethrough. The discharge apertures 107 are disposed above an active inlet area for the tray therebeneath which includes a trough 104 having a plurality of venting chambers 51*a* disposed therein. The trough 104 is formed from a contoured tray region incorporating a bottom tray section 140, angulated frontal wall 141 and upper plate section 142 which may be constructed with a truss section 143 adapted for underlying support of the tray 49 adjacent thereto. Trough 104 is constructed with the venting chambers 51*a* preferably welded into the bottom thereof, over apertures 140*a* cut into bottom 140. In other words, the venting chambers 51*a* comprise upstanding regions and structural portions of the trough 104 and are preferably disposed beneath the downcomer 102 in position for maximum flow efficiency therewith. In one preferred embodiment, the venting chambers 51*a* are vertically aligned between discharge orifices 107 of the downcomer 102 for permitting the liquid 13 discharged therefrom to splash between adjacent venting chambers 51*a*. This configuration further dampens the flow of liquid 13 downwardly from the downcomer 102 and absorbs the energy therefrom. In addition, this liquid 13 flow arrangement does not directly interfere with the ascending flow of vapor 15 from the apertures 122.

Referring still to FIG. 6, the venting chambers 51*a* are each preferably constructed in the form of a metal box having a top 150, opposite end walls 151 and 152, a side walls 153 and opposite side wall (not shown in this view). The bottom 155 of the venting chamber 51*a* is, as described above, open and welded directly to the aperture 140*a* formed in bottom 140 of trough 104. The side wall 153 is angulated in the region of angulated frontal wall 141 and likewise welded against this trough wall formed thereagainst. In this configuration, vapor 15 is permitted to vent directly from the region beneath the trough 104 directly into the downflowing liquid 13 from the downcomer 102 for passage therefrom through the vapor tunnel 103*a*. The combination of vapor tunnel 103*a* and the venting chambers 51*a* affords improved efficiency in a downcomer tray assembly as described herein.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved downcomer-tray assembly for a gas liquid contact tower of the type having a downcomer disposed above a tray inlet area adjacent a tray active area adapted for the flow of liquid thereover, the improvement comprising said downcomer having a generally semi-conical lower region forming a vapor tunnel outwardly thereof and a liquid confinement wall inwardly thereof terminating in at least one discharge opening disposed above said inlet area, and said inlet area comprising a plurality of venting chambers upstanding therein for the passage of vapor therethrough for facilitating said vapor passage upwardly through said vapor tunnel.

2. The apparatus as set forth in claim 1 wherein said inlet area further comprises a trough with said venting chambers secured therein and said venting chambers each comprising a generally boxed shaped element formed with side walls comprising upstanding sections of said trough.

3. The apparatus as set forth in claim 2 wherein said boxed shaped elements further include opposite side walls disposed in generally parallel spaced relationship and atop disposed thereacross, said side walls having a plurality of apertures formed therein for the venting of vapor therethrough.

4. The apparatus as set forth in claim 3 wherein said boxed shaped elements are generally rectangular in shape.

5. The apparatus as set forth in claim 4 wherein said boxed shaped elements are formed with at least one row of apertures on opposite sides thereof for venting said vapor therethrough.

6. The apparatus as set forth in claim 5 wherein said vapor venting chambers are disposed in an array forming a first pattern along said trough.

7. The apparatus as set forth in claim 6 wherein said downcomer includes a plurality of discharge openings, said discharge openings being disposed in a second pattern aligned above said first pattern of venting chambers.

8. The apparatus as set forth in claim 7 wherein said alignment of said first pattern with said second pattern includes alignment of said discharge openings with the regions between said venting chambers of said trough whereby liquid discharged from said discharge openings falls in said region between said venting chambers.

9. The apparatus as set forth in claim 1 wherein said downcomer comprises a plurality of generally planar walls, each of said walls tapering downwardly to define a downcomer discharge area, said discharge area being narrower than an upper region of said downcomer to thereby establish a dynamic liquid seal therein.

10. The apparatus as set forth in claim 1 wherein said downcomer further includes a series of discharge apertures disposed in a discharge region of said downcomer, the majority of said apertures of said discharge region of said downcomer being aligned to discharge liquid onto regions between said venting chambers.

11. The apparatus as set forth in claim 10 wherein said venting chambers are disposed in generally parallel spaced relationship forming upstanding portions of said inlet area.

12. The apparatus as set forth in claim 1 wherein said downcomer is disposed in a chordal region of said tower for the passage of liquid therethrough.

13. A method of venting vapor through a region of a vapor liquid contact tower of the type wherein a downcomer is positioned above an inlet area of a tray for the discharge of liquid thereon for passage across the top of said tray, said inlet area of said tray being further adapted for the passage of ascending vapor therethrough and its mixture with said liquid discharged from said downcomer, said method comprising the steps of:

forming said downcomer with tapered, generally semiconical side walls;

terminating said tapered downcomer walls across a relatively narrow downcomer discharge region;

securing said narrow discharge region of said downcomer above said inlet area;

forming said inlet area in a trough configuration relative to said tray, said trough being disposed substantially beneath said discharge region of said downcomer and adapted for collecting liquid therein; and forming said inlet area of said trough with a plurality of vapor venting chambers upstanding therefrom and having vapor discharge openings therein.

14. The method as set forth in claim 13, and further including the step of forming said venting chambers in generally box shaped configurations having a height sufficient to dispose said discharge openings above the top of said tray for providing preferential vapor flow therethrough from the tray region therebeneath.

15. The method as set forth in claim 13 and including the step of forming said venting chambers with side walls comprising upstanding sections of said trough.

16. The method as set forth in claim 15 and further including the steps of providing a top across said side walls and forming a plurality of apertures in said side walls beneath said top for the venting of vapor therethrough.

17. The method as set forth in claim 15 and further including the step of forming said side walls with at least one row of apertures in opposite sides thereof.

18. The method as set forth in claim 15 and further including the step of disposing said venting chambers in an array forming a first pattern along said trough.

19. The method as set forth in claim 18 and further including the step of forming said downcomer with a plurality of discharged openings, and disposing said discharge openings in a second pattern complimenting said first pattern of venting chambers.

20. The method as set forth in claim 19 wherein said step of disposing said discharge openings in said second pattern includes the step of aligning said discharge openings with the regions between said venting chambers of said trough and discharging liquid from said discharge openings to said region between said venting chambers.

21. A downcomer-tray assembly for gas liquid contact tower comprising:

a downcomer;

a tray disposed below said downcomer;

a tray inlet area disposed beneath said downcomer adapted for the flow of liquid thereon and the passage of gas upwardly therethrough;

said downcomer being formed with a generally semiconical wall region forming a vapor tunnel outwardly thereof and a liquid confinement wall inwardly thereof terminating in at least one discharge opening disposed above said inlet area; and a plurality of venting chambers upstanding from said inlet area beneath said downcomer for facilitating the passage of vapor therethrough and into said vapor tunnel.

22. The apparatus as set forth in claim 21 wherein said inlet area is formed as a trough and said venting chambers are each comprised of a generally boxed shaped element formed with side walls comprising upstanding sections of said trough.

23. The apparatus as set forth in claim 22 wherein said boxed shaped elements further include opposite side walls disposed in generally parallel spaced relationship and atop disposed thereacross, said side walls having a plurality of apertures formed therein for the venting of vapor therethrough.

24. The apparatus as set forth in claim 23 wherein said boxed shaped elements are generally rectangular in shape.

25. The apparatus as set forth in claim 24 wherein said boxed shaped elements are formed with at least one row of apertures on opposite sides thereof for venting said vapor therethrough.

26. The apparatus as set forth in claim 25 wherein said vapor venting chambers are disposed in an array forming a first pattern along said trough.

27. The apparatus as set forth in claim 26 wherein said downcomer includes a plurality of discharge openings, said discharge openings being disposed in a second pattern aligned above said first pattern of venting chambers.

28. The apparatus as set forth in claim 27 wherein said alignment of said first pattern with said second pattern includes alignment of said discharge openings with the regions between said venting chambers of said trough whereby liquid discharged from said discharge openings falls in said region between said venting chambers.

29. The apparatus as set forth in claim 21 wherein said downcomer comprises a plurality of generally planar walls, each of said walls tapering downwardly to define a downcomer discharge area, said discharge area being narrower than an upper region of said downcomer to thereby establish a dynamic liquid seal therein.

30. The apparatus as set forth in claim 21 wherein said discharge opening of said downcomer further includes a series of discharge apertures, the majority of said apertures being aligned to discharge liquid onto said inlet area in the regions between said venting chambers.

31. The apparatus as set forth in claim 30 wherein said venting chambers are disposed in generally parallel spaced relationship therealong.

32. The apparatus as set forth in claim 21 wherein said downcomer is disposed in a chordal region of said tower for the passage of liquid therethrough.

33. A method of venting vapor through a region of a vapor liquid contact tower of the type wherein a downcomer is positioned above an inlet area of a tray for the discharge of liquid thereon for passage across the top of said tray, said inlet area of said tray being further adapted for the passage of ascending vapor therethrough and its mixture with said liquid discharged from said downcomer, said method comprising the steps of:

forming said downcomer with tapered, generally semiconical side walls;

terminating said tapered downcomer walls across a relatively narrow downcomer discharge region;

securing said narrow discharge region of said downcomer above said inlet area; and forming said inlet area of said tray with a plurality of vapor venting chambers upstanding therefrom and having vapor discharge openings therein.

34. The method as set forth in claim 33, and further including the steps of forming said inlet area in a trough configuration and forming said venting chambers in generally box shaped configurations having a height sufficient to dispose said discharge openings above the top of said tray relative to said trough for providing preferential vapor flow therethrough from the tray region therebeneath.

35. The method as set forth in claim 34 and including the step of forming said venting chambers with side walls comprising upstanding sections of said trough.

36. The method as set forth in claim 35 and further including the steps of providing a top across said side walls and forming a plurality of apertures in said side walls beneath said top for the venting of vapor therethrough.

37. The method as set forth in claim 35 and further including the step of forming said side walls with at least one row of apertures in opposite sides thereof.

38. The method as set forth in claim 35 and further including the step of disposing said venting chambers in an array forming a first pattern along said trough.

39. The method as set forth in claim 38 and further including the step of forming said downcomer with a plurality of discharge openings, and disposing said discharge openings in a second pattern complimenting said first pattern of venting chambers.

40. The method as set forth in claim 39 wherein said step of disposing said discharge openings in said second pattern includes the step of aligning said discharge openings with the regions between said venting chambers of said trough and discharging liquid from said discharge openings to said region between said venting chambers.

* * * * *